(12) United States Patent
Kutch

(10) Patent No.: US 8,578,378 B2
(45) Date of Patent: Nov. 5, 2013

(54) FACILITATING COMPATIBLE INTERACTION, AT LEAST IN PART

(75) Inventor: Patrick G. Kutch, Tigard, OR (US)

(73) Assignee: Intel Corporation, Santa Clara, CA (US)

( * ) Notice: Subject to any disclaimer, the term of this patent is extended or adjusted under 35 U.S.C. 154(b) by 195 days.

(21) Appl. No.: 13/192,934

(22) Filed: Jul. 28, 2011

(65) Prior Publication Data

US 2013/0031547 A1    Jan. 31, 2013

(51) Int. Cl.
*G06F 9/455*    (2006.01)

(52) U.S. Cl.
USPC ............................................................ 718/1

(58) Field of Classification Search
None
See application file for complete search history.

(56) References Cited

U.S. PATENT DOCUMENTS

| | | | |
|---|---|---|---|
| 5,630,076 A * | 5/1997 | Saulpaugh et al. ........... | 710/104 |
| 2003/0061497 A1 | 3/2003 | Zimmer | |
| 2006/0101476 A1 * | 5/2006 | Robert .......................... | 719/328 |
| 2007/0067589 A1 * | 3/2007 | Mishra et al. ................. | 711/163 |
| 2008/0168258 A1 | 7/2008 | Armstrong et al. | |
| 2008/0172554 A1 * | 7/2008 | Armstrong et al. ............. | 713/2 |
| 2009/0070760 A1 | 3/2009 | Khatri et al. | |
| 2013/0055259 A1 * | 2/2013 | Dong ............................. | 718/1 |

OTHER PUBLICATIONS

International Search Report and Written Opinion received for PCT Patent application No. PCT/US2012/048156, mailed on Dec. 27, 2012, 8 pages.
Intel, "Intel® Virtualization Technology for Directed I/O", Architecture Specification,Revision: 1.3, Feb. 2011, 152 pages.
RFC: Network Plugin Architecture (NPA) for vmxnet3, Archive Orange, retrieved on Jun. 21, 2011, 24 pages Available at : http://web.archiveorange.com/archive/v/UmXevPd7zWmJVNPF0jr1.
"Single Root I/O Virtualization and Sharing Specification", Revision 1.1, Jan. 20, 2010, pp. 1-90.
"To VT-d or Not to VT-d? A guide on whether to Utilize Direct DeviceAttach in your Virtualized System ?", retrieved on Jun. 21, 2011, 4 pages Available at: http://software.intel.com/en-us/blogs/2010/05/13/to-vt-d-or-not-to-vt-d-a-guide-on-whether-to-utilize-direct-device-attach-in-your-virtualized-system/.

* cited by examiner

*Primary Examiner* — Emerson Puente
*Assistant Examiner* — Sisley Kim
(74) *Attorney, Agent, or Firm* — Christopher K. Gagne

(57) ABSTRACT

An embodiment may include circuitry to determine compatibility, at least in part, of a device with at least one process intended to interact with, at least in part, the device. Such compatibility may be determined by the circuitry based at least in part upon at least one feature set of the device. If the device is incompatible, at least in part, with the at least one process, the circuitry may identify, at least in part, the device in manner that facilitates compatible interaction, at least in part, between the at least one process and at least one portion of the at least one feature set. Many alternatives, variations, and modifications are possible.

15 Claims, 4 Drawing Sheets

FACILITATING COMPATIBLE INTERACTION, AT LEAST IN PART

FIELD

This disclosure relates to facilitating compatible interaction, at least in part.

BACKGROUND

In one conventional arrangement, a virtualized environment includes a host in which a virtual machine monitor (VMM) and multiple virtual machines (VM) are resident. The host includes one or more physical resources that are presented to a VM by the VMM as a virtual function associated with a virtual device. For example, the VMM provides the VM with a virtual device identification value that the VM uses to load a corresponding device driver that accesses physical registers associated with the identification to utilize a virtual function provided by the virtual device identified by the identification.

In this conventional arrangement, attempting to upgrade these one or more physical resources with one or more new physical resources can have undesirable consequences. For example, in this arrangement, unless the VM is able to load and execute a device driver that has been specifically designed to use the one or more new physical resources, the VM typically will be unable to use the one or more new physical resources.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
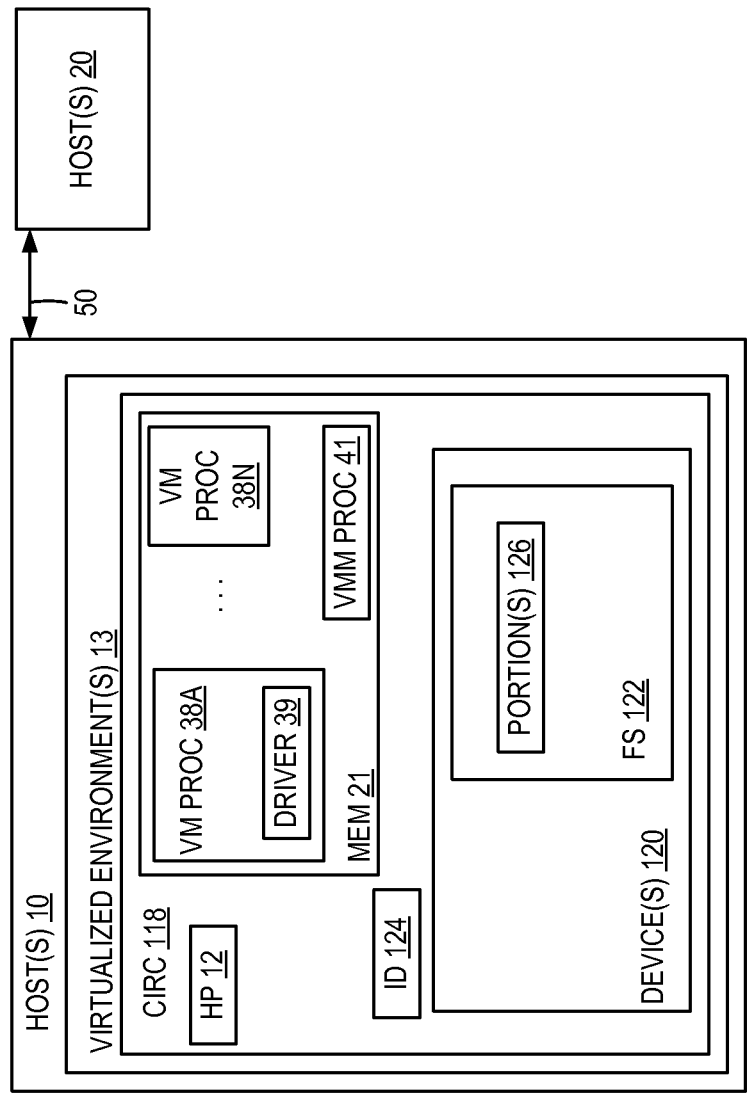
FIG. 1 illustrates a system embodiment.

FIG. 1 illustrates a system embodiment 100. System 100 may include one or more hosts 10 that may be communicatively coupled, via network 50, to one or more other hosts 20. In this embodiment, one or more hosts 10 and one or more hosts 20 may be geographically remote from each other. In an embodiment, the terms "host computer," "host," "server," "client," "network node," "end station," "end node," "intermediate node," "intermediate station," and "node" may be used interchangeably, and may mean, for example, without limitation, one or more end stations, mobile internet devices, smart phones, media (e.g., audio and/or video) devices, input/output (I/O) devices, tablet computers, appliances, intermediate stations, network interfaces, clients, servers, and/or portions thereof.

In this embodiment, a "network" may be or comprise any mechanism, instrumentality, modality, and/or portion thereof that may permit, facilitate, and/or allow, at least in part, two or more entities to be communicatively coupled together. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands. Although the one or more hosts 10 and/or 20, and/or one or more networks 50 may be referred to in the singular, it should be understood that each such respective component may comprise a plurality of such respective components without departing from this embodiment.

In this embodiment, one or more hosts 20 may comprise respective components that may be identical or substantially similar, at least in part, in their respective constructions, operations, and/or capabilities to the respective construction, operation, and/or capabilities (e.g., described herein) of the respective components of one or more hosts 10. Of course, alternatively, without departing from this embodiment, the respective constructions, operations, and/or capabilities of one or more hosts 20 (and/or one or more components thereof) may differ, at least in part, from the respective construction, operation, and/or capabilities of one or more hosts 10 (and/or one or more components thereof).

One or more hosts 10 may comprise and/or execute, at least in part, one or more virtualized environments 13. One or more environments 13 may comprise circuitry 118 that may and/or be used to execute, and/or may be involved in and/or facilitate the execution, at least in part, of the one or more virtualized environments 13. For example, circuitry 118 may comprise one or more single and/or multi-core host processors (HP)/central processing units (CPU) 12, computer-readable/writable memory 21, and/or one or more devices 120. In this embodiment, although not shown in the Figures, HP 12 and/or memory 21 may be comprised, at least in part, in one or more system motherboards. Also although not shown in the Figures, one or more devices 120 may be comprised, at least in part, in one or more circuit boards. The one or more not shown system motherboards may be physically and communicatively coupled to the one or more not shown circuit boards via a not shown bus connector/slot system. These one or more not shown motherboards also may comprise one or more not shown chipsets that may comprise, e.g., memory, input/output controller circuitry, and/or network interface controller circuitry. One or more host processors 12 may be communicatively coupled via these one or more chipsets to memory 21, the not shown circuit board, and/or one or more devices 120.

Alternatively or additionally, although not shown in the Figures, some or all of one or more devices 120, and/or the functionality and components thereof (and/or of the one or more not shown circuit boards), may be comprised in, for example, one or more host processors 12 and/or the one or more not shown chipsets.

One or more devices 120 may be associated, at least in part, with one or more virtualized environments 12 and may comprise one or more feature sets (FS) 122. These one or more feature sets 122 may be embodied in and/or comprise one or more portions 126. In this embodiment, the one or more feature sets 122 and/or one or more portions 126 thereof may be, comprise, and/or facilitate implementation of one or more network interface controller (NIC) related functions and/or features. These one or more NIC related functions and/or features may permit, for example, one or more hosts 10 to be communicatively coupled to and/or to exchange one or more packets with one or more hosts 10 via one or more networks 50.

In this embodiment, one or more VM processes 38A . . . 38N and/or one or more VMM processes 41 may be executed, at least in part, by one or more host processors 12 of circuitry 118. When so executed, at least in part, by one or more host processors 12, one or more processes 38A . . . 38N and/or one or more processes 41 may become resident, at least in part, in memory 21.

In this embodiment, "circuitry" may comprise, for example, singly or in any combination, analog circuitry, digital circuitry, hardwired circuitry, programmable circuitry, co-processor circuitry, processor circuitry, controller circuitry, state machine circuitry, and/or memory that may comprise program instructions that may be executed by programmable circuitry. Also in this embodiment, a host processor, processor, processor core, core, and/or controller each may comprise respective circuitry capable of performing, at least in part, one or more arithmetic and/or logical operations, such as, for example, one or more respective central processing units. Although not shown in the Figures, each of the hosts 10 and/or 20 may comprise a respective graphical user interface system. The not shown graphical user interface systems each may comprise, e.g., a respective keyboard, pointing device, and display system that may permit a human user to input commands to, and monitor the operation of, one or more hosts 10 and/or 20, and/or system 100.

Memory 21 may comprise one or more of the following types of memories: semiconductor firmware memory, programmable memory, non-volatile memory, read only memory, electrically programmable memory, random access memory, flash memory, magnetic disk memory, phase-change memory, optical disk memory, and/or other or later-developed computer-readable and/or writable memory. One or more machine-readable program instructions may be stored in memory 21, one or more host processors 12, the one or more not shown chipsets, one or more devices 120, and/or circuitry 118. In operation, these instructions may be accessed and executed by one or more host processors 12, circuitry 118, the one or more not shown chipsets, one or more devices 120, and/or circuitry 118. When so accessed executed, these one or more instructions may result in these one or more these components of system 100 performing operations described herein as being performed by these components of system 100.

In this embodiment, a portion, subset, or fragment of an entity may comprise all of, more than, or less than the entity. Additionally, in this embodiment, a value may be "predetermined" if the value, at least in part, and/or one or more algorithms, operations, and/or processes involved, at least in part, in generating and/or producing the value is predetermined, at least in part. Also, in this embodiment, a process, thread, daemon, program, driver, virtual machine, virtual machine monitor, operating system, application, and/or kernel each may (1) comprise, at least in part, and/or (2) result, at least in part, in and/or from, execution of one or more operations and/or program instructions. In this embodiment, a feature set may be, involve, specify, and/or comprise one or more physical, logical, and/or virtual (1) capabilities, functions, resources, and/or operations, (2) portions of circuitry, (3) processes, (4) instructions, (5) instruction sets, and/or (6) capabilities, functions, resources, and/or operations that may result from, be used by, and/or be implementable using one or more such portions of circuitry, processes, instructions, and/or instruction sets. In this embodiment, a device may comprise and/or utilize one or more feature sets. Also in this embodiment, a VMM and/or VMM process may permit and/or facilitate implementation and/or execution, at least in part, of one or more virtualized environments. In this embodiment, a virtualized environment may comprise, facilitate implementation of, and/or use, at least in part, device virtualization, input/output (I/O) virtualization, and/or one or more VM. In this embodiment, device virtualization, I/O virtualization, and/or a VM may relate to, involve, comprise, facilitate, and/or implement, at least in part, sharing and/or management of the use of a feature set, e.g., between or among multiple entities.

In this embodiment, hosts 10 and 20 may exchange data and/or commands via network 50 in accordance with one or more protocols. In this embodiment, these one or more protocols may be compatible with, e.g., one or more Ethernet and/or Transmission Control Protocol/Internet Protocol (TCP/IP) protocols.

For example, one or more Ethernet protocols that may be utilized in system 100 may comply or be compatible with Institute of Electrical and Electronics Engineers, Inc. (IEEE) Std. 802.3-2008, Dec. 26, 2008. The TCP/IP protocol that may be utilized in system 100 may comply or be compatible with the protocols described in Internet Engineering Task Force (IETF) Request For Comments (RFC) 791 and 793, published September 1981. Many different, additional, and/or other protocols (including, for example, those related to those stated above) may be used for such data and/or command exchange without departing from this embodiment (e.g., earlier and/or later-developed versions of the aforesaid, related, and/or other protocols).

Also in this embodiment, I/O virtualization, messaging, transmission, management, and/or translation techniques may be implemented, at least in part, by circuitry 118, the not shown chipset, one or more VMM processes 41, one or more VM processes 38A . . . 38N, and/or one or more devices 120 that may comply and/or be compatible, at least in part, with one or more Peripheral Component Interconnect (PCI)-Special Interest Group (SIG) protocols. For example, such protocols may comply and/or be compatible, at least in part, with one or more protocols disclosed in PCI Express Base Specification 2.0, 2007, PCI-SIG Single Root I/O Virtualization And Sharing Specification, Rev. 1.1, 2010, and/or PCI-SIG Address Translation Services Specification, Rev. 1.0, 2007. Of course, many different, additional, and/or other protocols (including, for example, those stated above) may be implemented in one or more hosts 10 without departing from this embodiment (e.g., earlier and/or later-developed versions of the aforesaid, related, and/or other protocols).

In operation, in this embodiment, the execution of one or more VMM processes 41 by circuitry 118 may result in circuitry 118 determining compatibility, at least in part, of one or more devices 120 with one or more processes (e.g., one or more VM processes 38A and/or one or more virtual function device drivers 39 comprised in one or more VM processes 38A) intended to interact with and/or use, at least in part, one or more devices 120. In this embodiment, such compatibility may be determined, at least in part, by circuitry 118 (e.g., as a result of the execution of one or more VMM processes 41), based at least in part upon one or more FS 122 of the one or more devices 120. Also in this embodiment, if the one or more devices 120 are incompatible, at least in part, with these one or more processes 38A and/or 39, then the circuitry 118 may identify, at least in part, the one or more devices 120 in a manner that facilitates compatible interaction, at least in part, between the one or more processes 38A and one or more portions (e.g., one or more portions 126) of the one or more FS 122 of the one or more devices 120. In this embodiment, a first entity may be considered compatible, at least in part, with a second entity if the first entity is capable of interacting, at least in part, with at least one portion of the second entity's feature set.

Figure 2:
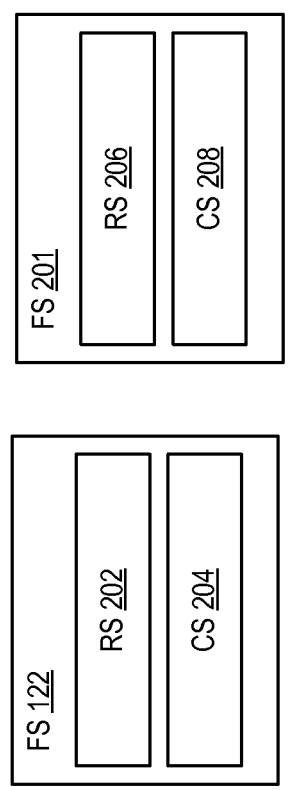
FIG. 2 illustrates features in an embodiment.

For example, as shown in FIG. 2, in this embodiment, one or more FS 122 may comprise one or more register sets (RS) 202 and/or one or more configuration spaces (CS) 204. In this embodiment, a register set may be or comprise one or more registers, such as, for example, one or more command and/or data registers that may permit data and/or commands to be exchanged with one or more devices 120 for the purpose of, e.g., controlling and/or monitoring, at least in part, one or more operations, functions, and/or capabilities of one or more devices 120. Also, in this embodiment, a configuration space may be, comprise, and/or specify one or more memory locations and/or one or more resources, such as, for example, one or more PCI configuration spaces that may comply, at least in part, with one or more PCI-SIG protocols.

For example, during operation of this embodiment, one or more VMM processes 41 may trap one or more configuration space probes initiated by one or more VM processes 38A that may be intended, at least in part, by one or more processes 38A as an attempt to identify and/or utilize one or more devices 120 that may be associated, at least in part, with one or more virtualized environments 13. In response, at least in part, to this attempt by one or more VM processes 38A, one or more VMM processes 41 may determine, at least in part, whether the one or more devices 120 are compatible with one or more processes 38 and/or 39. In this embodiment, one or more devices 120 may be considered to be compatible with one or more processes 38 and/or 39 if the one or more processes 38 and/or 39 are capable of interacting with the entirety of the one or more FS 122. Conversely, in this embodiment, one or more devices 120 may be considered to be incompatible, at least in part, with one or more processes 38 and/or 39 if one or more processes 38 and/or 39 are incapable of interacting with the entirety of one or more FS 122.

If one or more VMM processes 41 determines, at least in part, that one or more devices 120 are compatible with one or more processes 38A and/or 39, the execution of one or more VMM processes 41 by circuitry 118 may result in circuitry 118 and/or one or more processes 41 presenting and/or issuing to one or more processes 38A and/or 39 (e.g., in response, at least in part, to the one or more VM processes 38A to attempt to identify one or more devices 120) one or more identifiers (ID) 124 to identify one or more devices 120. In this example, one or more identifiers 124 may identify, at least in part, one or more devices 120 in terms of, by indicating, by providing, and/or by specifying one or more identifications of one or more virtual functions, one or more logical, physical, and/or virtual device, one or more features sets, and/or one or more configuration spaces that may be associated with, comprised in, used by, and/or implemented by one or more devices 120, at least in part. For example, if one or more devices 120 are compatible with one or more processes 38A and/or 39, then one or more identifiers 124 may be or comprise virtual device identifications associated with and/or identifying one or more FS 122. For example, in this case, these one or more virtual device identifiers 124 may be associated with and/or may identify one or more FS 122 (e.g., including the entirety of one or more register sets 202 and one or more configuration spaces 204).

Conversely, if one or more VMM processes 41 determines, at least in part, that one or more devices 120 are incompatible, at least in part, with one or more processes 38A and/or 39, one or more identifiers 124 may identify one or more devices 120 in a manner that may facilitate compatible interaction, at least in part, between one or more processes 38A and/or 39 and one or more portions 126 of one or more FS 122. For example, in this case, one or more identifiers 124 may identify, at least in part, one or more devices 120 in a manner that indicates that compatible interaction is possible via one or more other FS 201 (see FIG. 2) that may include one or more other register sets 206 and/or one or more other configuration spaces 208.

Figure 3:
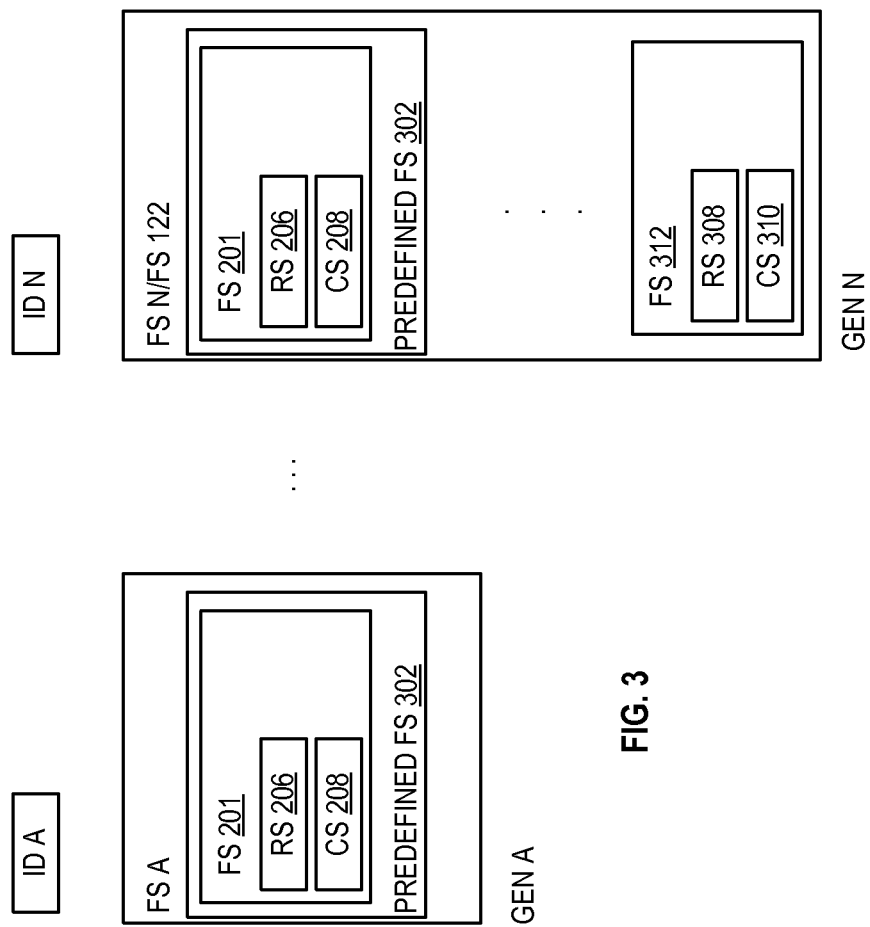
FIG. 3 illustrates features in an embodiment.

For example, as shown in FIG. 3, in this embodiment, different respective generations (GEN) A . . . N of device feature sets (e.g., associated with and/or comprised in different generations of one or more devices 120) may be associated with respective FS A . . . N. In this embodiment, a generation of an entity may be a version of the entity that may be sold, produced, designed, constructed, and/or operated at a respective time. In this embodiment, different respective generations of an entity may (but are not required to) comprise and/or be associated with different respective feature sets. By way of example, as shown in FIG. 3, a first designed generation of device feature set GEN A may comprise FS A that may only comprise one or more predefined FS 302. Conversely, a later designed generation of device feature set GEN N may comprise FS N that may comprise multiple feature sets, including, for example, the one or more predefined FS 302 and one or more additional feature sets 312. In this embodiment, one or more additional FS 312 may include one or more additional register sets 308 and/or one or more additional configuration spaces 310. In this example, one or more FS A, 302, and/or 201 may be identical to each other, and may correspond to one or more portions 126 of one or more FS 122. Also in this example, FS N may correspond identically to one or more FS 122. One or more FS A may be identifiable by one or more identifiers ID A. One or more FS N may be identifiable by one or more identifiers ID N.

In this embodiment, one or more predefined FS 302 may be intended to be common across multiple generations GEN A . . . N of device feature sets for the purpose of maintaining backward compatibility, at least in part, across these multiple generations GEN A . . . GEN N of device feature sets. That is, each and every one of these generations GEN A . . . GEN N may comprise its own respective copy of one or more common, predefined FS 302. The one or more FS A of the first GEN A may merely comprise the one or more common feature sets 302. However, although every succeeding later generation also comprises a respective copy of the one or more predefined FS 302, such succeeding generations also may comprise other and/or additional respective feature sets. For example, generation GEN N may comprise both the one or more predefined FS 302 and one or more additional FS 312. Thus, one or more FS N and/or 122 may be more extensive than FS A, 302, and/or 201, and/or one or more portions 126 of one or more FS 122. As a result of designing each of these generations GEN A . . . N to include the one or more predefined, common feature sets 302, so long as one or more VM processes 38A and/or one or more driver processes 39 have been designed to be compatible any of the generations GEN A . . . N, one or more processes 38A and/or 39 may interact compatibly with any of the other generations, at least to the extent of being able to interact with and/or use the one or more predefined FS 302. Advantageously, this may permit later generations of device feature sets to be backward compatible with VM and/or device driver processes that otherwise might not be able to interact compatibly with such later generations of device feature sets. Advantageously, this may permit one or more processes 38A and/or 39 to be able to interact compatibly, at least with respect to the one or more common predefined feature sets 302, with one or more devices 120, even if one or more processes 38A and/or 39 may be incompatible with (and therefore may be unable to interact with and/or use) other and/or additional portions (e.g., FS 312) of the feature set of the one or more devices 120. Thus, regardless of which one of the generations GEN A . . . GEN N that one or more devices 120 may be part of, associated with, and/or embody, one or more processes 38A and/or 39 may be able to interact compatibly with at least the predefined FS 302 comprised in one or more devices 120. Further advantageously, these features of this embodiment may make it possible to upgrade one or more devices 120 (e.g., to later generations thereof) without this rendering one or more processes 38A and/or 39 unable to use the one or more upgraded devices.

For example, in this embodiment, if one or more VMM 41 determines that one or more devices 120 are incompatible, at least in part, with one or more processes 38A and/or 39, one or more identifiers 124 may correspond to one or more identifiers ID A. Conversely, if, for example, one or more VMM 41 determines that one or more devices 120 are compatible with one or more processes 38A and/or 39, one or more identifiers 124 may correspond to one or more identifiers ID N.

In response, at least in part, to one or more identifiers 124, one or more processes 38A and/or 39 may interact with and/or use the one or more FS that may be identified by and/or associated with the one or more identifiers 124. For example, if one or more identifiers 124 correspond to one or more identifiers ID A, then one or more processes 38A and/or 39 may interact with and/or use one or more FS A, 302, and/or 201 identified by and/or associated with one or more identifiers ID A. Conversely, for example, if one or more identifiers 124 correspond to one or more identifiers ID N, then one or more processes 38A and/or 39 may interact with and/or use one or more FS N and/or 122 (including, e.g., both FS 302 and 312) identified by and/or associated with one or more identifiers ID N. For example, in response at least in part to one or more identifiers 124, one or more VM processes 38A may load and/or execute (as one or more driver processes 39) one or more particular driver processes that may be capable of interacting compatibly with and/or utilizing the one or more particular feature set and/or configuration spaces associated with and/or identified by the one or more identifiers 124.

Figure 4:
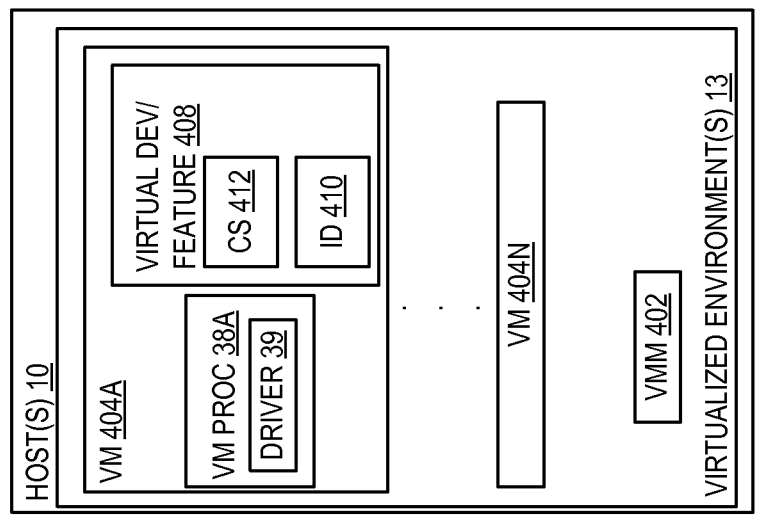
FIG. 4 illustrates features in an embodiment.

As a result, at least in part, of the execution in one or more hosts 10 of one or more virtualized environments 13, one or more VMM processes 41, and/or one or more VM processes 38A . . . 38N, one or more virtualized environments 13 may comprise one or more VMM 402 and/or VM 404A . . . 404N (see FIG. 4) that may be executed by one or more hosts 10. One or more VMM 402 may maintain, at least in part, the virtualized environment 13. One or more VM 404A may comprise one or more VM processes 38A that may comprise one or more driver processes 39. Depending upon the particular generation of one or more devices 120, one or more identifiers 124 may identify and/or present one or more devices 120, one or more FS 122, and/or one or more portions 126 of one or more FS 122 as one or more virtual devices/features/functions 408 that may include one or more virtual function identifiers 410 and/or one or more configuration spaces 412 associated with the one or more FS of that particular generation. As a result, in response to one or more identifiers 124, the one or more VM 404A may become associated with, take ownership of, comprise, and/or use the one or more virtual devices/features/functions 408 that may include one or more virtual function identifiers 410 and/or one or more configuration spaces 412.

Thus, an embodiment may include circuitry to determine compatibility, at least in part, of a device with at least one process intended to interact with, at least in part, the device. Such compatibility may be determined by the circuitry based at least in part upon at least one feature set of the device. If the device is incompatible, at least in part, with the at least one process, the circuitry may identify, at least in part, the device in manner that facilitates compatible interaction, at least in part, between the at least one process and at least one portion of the at least one feature set.

Many other and/or additional modifications, variations, and/or alternatives are possible without departing from this embodiment. For example, although the register sets in this embodiment may be physical register sets, without departing from this embodiment, one or more of such register sets may comprise abstracted and/or virtualized register sets and/or protocol layer constructs. Also without departing from this embodiment, analogous abstraction and/or virtualization techniques may be employed in connection with one or more of the configuration spaces identified by one or more identifiers 124. Additionally, although the one or more identifiers 124 may be compatible with one or more PCI-SIG protocols, without departing from this embodiment, one or more identifiers 124 may not be compatible with such protocols and/or may be compatible with other protocols. Furthermore, without departing from this embodiment, although not shown in the Figures, the one or more predefined feature sets (and/or other feature sets in the respective device feature set generations) may not comprise one or more configuration spaces, but instead, these one or more configuration spaces may be assigned by one or more VMM processes on a case by case (and/or other) basis. Accordingly, this embodiment should be viewed broadly as encompassing all such alternatives, modifications, and variations.

What is claimed is:

1. An apparatus comprising:
   circuitry to determine compatibility, at least in part, of a device with at least one process intended to interact with, at least in part, the device, the compatibility being determined by the circuitry based at least in part upon at least one device feature set of the device, the at least one device feature set comprising at least one certain feature set and at least one additional feature set;
   if the device is incompatible, at least in part, with the at least one process, the circuitry is to identify, at least in part, the device to the at least one process by providing to the at least one process at least one identifier that identifies the at least one device feature set as comprising solely the at least one certain feature set, the at least one certain feature set being of a relatively earlier produced device version, the at least one relatively earlier produced device version being relative to at least one relatively later produced device version that comprises the at least one additional feature set and the at least one certain feature set; and
   if the device is compatible with the at least one process, the circuitry is to identify, at least in part, the device to the at least one process by providing to the at least one process at least one different identifier that identifies the at least one device feature set as comprising the at least one additional feature set and the at least one certain feature set that are comprised in the at least one relatively later produced device version, wherein:

the at least one device feature set comprises a first register set and a first configuration space;

the at least one process is capable of interacting with, at least in part, a second register set and a second configuration space; and if the device is incompatible, at least in part, with the at least one process, the circuitry is to identify, at least in part, the device in a manner that indicates that the compatible interaction is possible via the second register set and the second configuration space.

2. The apparatus of claim 1, wherein:

at least one portion of the at least one device feature set comprises a predefined feature set that is intended to be common across multiple generations of device feature sets for the purpose of maintaining backward compatibility, at least in part, across the multiple generations;

the at least one process comprises at least one driver intended to interact with, at least in part, the device; and if the device is incompatible, at least in part, with the at least one process, the circuitry is to identify, at least in part, the device by providing, at least in part, at least one device identification and configuration space associated, at least in part, with the at least one portion of the at least one device feature set.

3. The apparatus of claim 1, wherein:

the circuitry is to execute, at least in part, at least one virtual machine monitor (VMM) process, the at least one VMM process to determine the compatibility, at least in part, the at least one VMM process also to identify the device, in response, at least in part, to an attempt by at least one virtual machine (VM) process to identify one or more devices associated, at least in part, with a virtualized environment that comprises the at least one VM process; and if the device is compatible with the at least one process, the at least one VMM process is to provide a virtual device identification that is associated with the at least one device feature set.

4. The apparatus of claim 1, wherein:

the at least one process comprises at least one device driver in a virtual machine;

at least one host is to execute at least one virtual machine monitor that is to maintain a virtualized environment that includes the virtual machine; and the device is to be identified to the at least one process by the at least one virtual machine monitor in terms of one or more virtual function device identifiers and one or more configuration spaces associated with the device.

5. The apparatus of claim 1, wherein:

the at least one portion of the at least one certain feature set comprises a predefined feature set that is intended to be common across multiple generations of device feature sets for the purpose of maintaining backward compatibility, at least in part, across the multiple generations;

the at least one device feature set is more extensive than the at least one portion of the at least one device feature set;

the at least one device feature set and the at least one portion of the at least one device feature set are associated with different respective ones of the multiple generations;

if the device is compatible with the at least one process, the at least one process is capable of interacting with an entirety of the at least one device feature set, and the circuitry is to identify the device using an identification that is associated with the at least one device feature set; and if the device is incompatible, at least in part, with the at least one process, the at least one process is incapable of interacting with the entirety of the at least one device feature set, and the circuitry is to identify the device using another identification that is associated with the at least one portion of the at least one device feature set.

6. The apparatus of claim 1, wherein:

one or more of the at least one device feature set and at least one portion of the at least one device feature set are to be presented, at least in part, as one or more virtual features.

7. A method comprising:

using circuitry, at least in part, to determine compatibility, at least in part, of a device with at least one process intended to interact with, at least in part, the device, the compatibility being determined by the circuitry based at least in part upon at least one device feature set of the device, the at least one device feature set comprising at least one certain feature set and at least one additional feature set; and if the device is incompatible, at least in part, with the at least one process, the circuitry is to identify, at least in part, the device to the at least one process by providing to the at least one process at least one identifier that identifies the at least one device feature set as comprising solely the at least one certain feature set, the at least one certain feature set being of a relatively earlier produced device version, the at least one relatively earlier produced device version being relative to at least one relatively later produced device version that comprises the at least one additional feature set and the at least one certain feature set; and if the device is compatible with the at least one process, the circuitry is to identify, at least in part, the device to the at least one process by providing to the at least one process at least one different identifier that identifies the at least one device feature set as comprising the at least one additional feature set and the at least one certain feature set that are comprised in the at least one relatively later produced device version, wherein:

the at least one device feature set comprises a first register set and a first configuration space;

the at least one process is capable of interacting with, at least in part, a second register set and a second configuration space; and if the device is incompatible, at least in part, with the at least one process, the circuitry is to identify, at least in part, the device in a manner that indicates that the compatible interaction is possible via the second register set and the second configuration space.

8. The method of claim 7, wherein:

at least one portion of the at least one device feature set comprises a predefined feature set that is intended to be common across multiple generations of device feature sets for the purpose of maintaining backward compatibility, at least in part, across the multiple generations;

the at least one process comprises at least one driver intended to interact with, at least in part, the device; and if the device is incompatible, at least in part, with the at least one process, the circuitry is to identify, at least in part, the device by providing, at least in part, at least one device identification and configuration space associated, at least in part, with the at least one portion of the at least one device feature set.

9. The method of claim 7, wherein:

the circuitry is to execute, at least in part, at least one virtual machine monitor (VMM) process, the at least one VMM process to determine the compatibility, at least in part, the at least one VMM process also to identify the device, in response, at least in part, to an attempt by at least one virtual machine (VM) process to identify one or more devices associated, at least in part, with a virtualized environment that comprises the at least one VM process; and if the device is compatible with the at least one process, the at least one VMM process is to provide a virtual device identification that is associated with the at least one device feature set.

10. Computer-readable memory storing one or more instructions that when executed by a machine result in performance of operations comprising:

using circuitry, at least in part, to determine compatibility, at least in part, of a device with at least one process intended to interact with, at least in part, the device, the compatibility being determined by the circuitry based at least in part upon at least one device feature set of the device, the at least one device feature set comprising at least one certain feature set and at least one additional feature set; and if the device is incompatible, at least in part, with the at least one process, the circuitry is to identify, at least in part, the device to the at least one process by providing to the at least one process at least one identifier that identifies the at least one device feature set as comprising solely the at least one certain feature set, the at least one certain feature set being of a relatively earlier produced device version, the at least one relatively earlier produced device version being relative to at least one relatively later produced device version that comprises the at least one additional feature set and the at least one certain feature set; and if the device is compatible with the at least one process, the circuitry is to identify, at least in part, the device to the at least one process by providing to the at least one process at least one different identifier that identifies the at least one device feature set as comprising the at least one additional feature set and the at least one certain feature set that are comprised in the at least one relatively later produced device version, wherein:

the at least one device feature set comprises a first register set and a first configuration space;

the at least one process is capable of interacting with, at least in part, a second register set and a second configuration space; and if the device is incompatible, at least in part, with the at least one process, the circuitry is to identify, at least in part, the device in a manner that indicates that the compatible interaction is possible via the second register set and the second configuration space.

11. The computer-readable memory of claim 10, wherein:

at least one portion of the at least one device feature set comprises a predefined feature set that is intended to be common across multiple generations of device feature sets for the purpose of maintaining backward compatibility, at least in part, across the multiple generations;

the at least one process comprises at least one driver intended to interact with, at least in part, the device; and if the device is incompatible, at least in part, with the at least one process, the circuitry is to identify, at least in part, the device by providing, at least in part, at least one device identification and configuration space associated, at least in part, with the at least one portion of the at least one device feature set.

12. The computer-readable memory of claim 10, wherein:

the circuitry is to execute, at least in part, at least one virtual machine monitor (VMM) process, the at least one VMM process to determine the compatibility, at least in part, the at least one VMM process also to identify the device, in response, at least in part, to an attempt by at least one virtual machine (VM) process to identify one or more devices associated, at least in part, with a virtualized environment that comprises the at least one VM process; and if the device is compatible with the at least one process, the at least one VMM process is to provide a virtual device identification that is associated with the at least one device feature set.

13. The computer-readable memory of claim 10, wherein:

the at least one process comprises at least one device driver in a virtual machine;

at least one host is to execute at least one virtual machine monitor that is to maintain a virtualized environment that includes the virtual machine; and the device is to be identified to the at least one process by the at least one virtual machine monitor in terms of one or more virtual function device identifiers and one or more configuration spaces associated with the device.

14. The computer-readable memory of claim 10, wherein:

at least one portion of the at least one device feature set comprises a predefined feature set that is intended to be common across multiple generations of device feature sets for the purpose of maintaining backward compatibility, at least in part, across the multiple generations;

the at least one device feature set is more extensive than the at least one portion of the at least one device feature set;

the at least one device feature set and the at least one portion of the at least one device feature set are associated with different respective ones of the multiple generations;

if the device is compatible with the at least one process, the at least one process is capable of interacting with an entirety of the at least one device feature set, and the circuitry is to identify the device using an identification that is associated with the at least one device feature set; and if the device is incompatible, at least in part, with the at least one process, the at least one process is incapable of interacting with the entirety of the at least one device feature set, and the circuitry is to identify the device using another identification that is associated with the at least one portion of the at least one device feature set.

15. The computer-readable memory of claim 10, wherein:

one or more of the at least one device feature set and at least one portion of the at least one device feature set are to be presented, at least in part, as one or more virtual features.

* * * * *